United States Patent
Itano et al.

(10) Patent No.: US 8,081,245 B2
(45) Date of Patent: Dec. 20, 2011

(54) IMAGE SENSING APPARATUS AND IMAGING SYSTEM

(75) Inventors: Tetsuya Itano, Zama (JP); Hidekazu Takahashi, Zama (JP); Koichiro Iwata, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 546 days.

(21) Appl. No.: 12/339,163

(22) Filed: Dec. 19, 2008

(65) Prior Publication Data

US 2009/0167914 A1   Jul. 2, 2009

(30) Foreign Application Priority Data

Dec. 28, 2007   (JP) .................. 2007-341121

(51) Int. Cl.
*H04N 5/335* (2006.01)
(52) U.S. Cl. ................ 348/301; 348/308; 348/294
(58) Field of Classification Search .......... 348/301, 348/308, 294; 257/291, 292
See application file for complete search history.

(56) References Cited

U.S. PATENT DOCUMENTS

| | | | |
|---|---|---|---|
| 7,321,110 B2 | 1/2008 | Okita et al. | 250/208.1 |
| 7,408,210 B2 | 8/2008 | Ogura et al. | 257/233 |
| 7,460,162 B2 | 12/2008 | Koizumi et al. | 348/294 |
| 7,462,810 B2 | 12/2008 | Kobayashi et al. | 250/208.1 |
| 2005/0168605 A1 | 8/2005 | Hiyama et al. | 348/301 |
| 2005/0270393 A1* | 12/2005 | Noda et al. | 348/308 |
| 2006/0226899 A1* | 10/2006 | Kasai et al. | 330/9 |
| 2006/0238633 A1 | 10/2006 | Kinugasa et al. | 348/300 |
| 2007/0052831 A1 | 3/2007 | Ogura et al. | 348/308 |
| 2007/0115377 A1 | 5/2007 | Noda et al. | 348/294 |
| 2008/0030612 A1 | 2/2008 | Itano et al. | 348/340 |
| 2008/0036890 A1 | 2/2008 | Yamashita et al. | 348/308 |
| 2008/0036891 A1 | 2/2008 | Ono et al. | 348/308 |
| 2008/0055445 A1* | 3/2008 | Hatano et al. | 348/302 |
| 2008/0158403 A1 | 7/2008 | Itano et al. | 348/308 |
| 2008/0211950 A1 | 9/2008 | Ono et al. | 348/308 |
| 2009/0015699 A1 | 1/2009 | Watanabe et al. | 348/308 |

FOREIGN PATENT DOCUMENTS

JP   2005-217158 A   8/2005

\* cited by examiner

*Primary Examiner* — Tuan Ho
*Assistant Examiner* — Shahbaz Nazrul
(74) *Attorney, Agent, or Firm* — Fitzpatrick, Cella, Harper & Scinto (57) ABSTRACT

An image sensing apparatus comprises a pixel array; a readout unit; a first terminal; and a second terminal, wherein the readout unit including a column amplification unit, a holding unit, a first power supply line, and a second power supply line, and wherein the column amplification unit including a transistor having a gate electrode and back-gate electrode, the gate electrode receiving a signal read out from a pixel on each column of the pixel array, and the holding unit including a capacitor having a first electrode and a second electrode, the first electrode receiving a signal amplified by the column amplification unit, and wherein the first power supply line transfers the first power supply voltage to the back-gate electrode of the transistor, and the second power supply line transfers the second power supply voltage to the second electrode of the capacitor.

5 Claims, 9 Drawing Sheets

IMAGE SENSING APPARATUS AND IMAGING SYSTEM

BACKGROUND OF THE INVENTION

1. Field of the Invention

The present invention relates to an image sensing apparatus and imaging system.

2. Description of the Related Art

An image sensing apparatus includes a pixel array in which a plurality of pixels are arrayed in the row and column directions, and a readout unit which reads out a signal from the pixel array.

According to a technique disclosed in Japanese Patent Laid-Open No. 2005-217158, a column amplifier (operational amplifier) for amplifying a signal read out from a pixel on each column of the pixel array, and an accumulation capacitor for holding a signal amplified by the column amplifier are arranged in the readout unit for each column of the pixel array. This technique increases the output resistance of the column amplifier in an arrangement in which the column amplifier and accumulation capacitor are connected to a common ground supply line. According to Japanese Patent Laid-Open No. 2005-217158, the voltage of the ground supply line hardly drops even upon variations in the operating current of the column amplifier.

However, according to the technique disclosed in Japanese Patent Laid-Open No. 2005-217158, the column amplifier and accumulation capacitor are connected to a common ground supply line. When a bright object is captured, a pseudo signal may be mixed in a pixel output.

More specifically, the column amplifier is an operational amplifier formed from a plurality of MOS transistors. The column amplifier includes an input transistor having a gate electrode and a back-gate electrode which receives a signal. The accumulation capacitor includes the first electrode for holding a signal, and the second electrode which faces the first electrode. In the technique disclosed in Japanese Patent Laid-Open No. 2005-217158, the back-gate electrode of the input transistor and the second electrode of the accumulation capacitor are connected to a common ground supply line.

Figure 8:
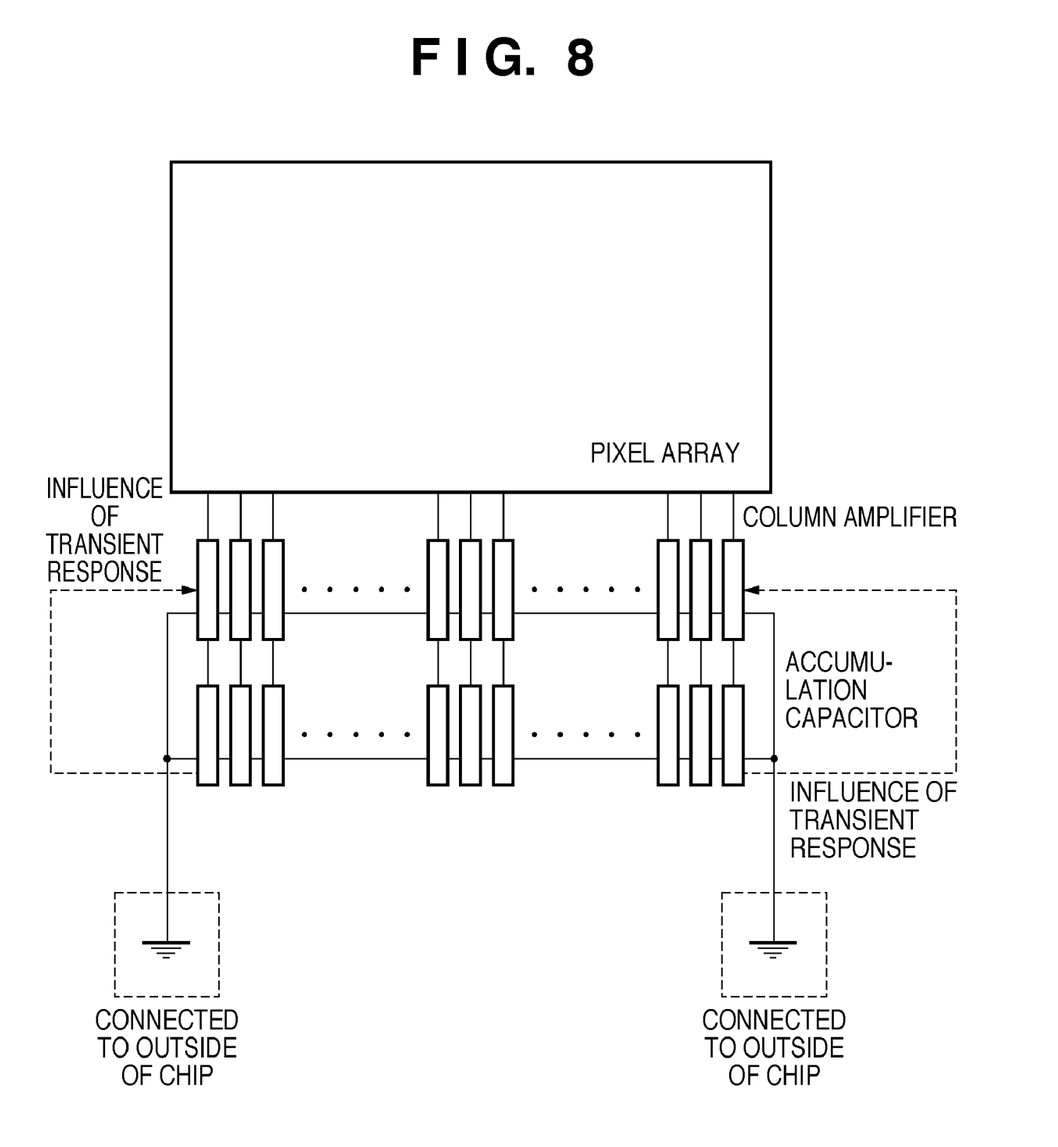
FIG. 8 is a diagram for explaining a problem to be solved by the present invention.

In this case, when a bright object is captured, a large signal is read out from a predetermined pixel in the pixel array of the image sensing apparatus, and held in the first electrode of the accumulation capacitor. As the potential of the first electrode fluctuates, the potential of the second electrode capacitively coupled to the first electrode also fluctuates, and the potential of the ground supply line fluctuates transiently. The transient response of the ground supply line influences the column amplifier, as shown in FIG. 8. Since the voltage of the back-gate electrode of the input MOS transistor of the column amplifier fluctuates, the column amplifier is likely to mix a pseudo signal in an input signal. For example, when the image of a bright part of an object which is dark in the entire frame is captured, a pseudo signal is superposed in a pixel output from a row corresponding to the bright part under the above-mentioned influence via the ground supply line.

SUMMARY OF THE INVENTION

It is an aim of the present invention to suppress mixing of a pseudo signal in a pixel output upon capturing a bright object.

According to the first aspect of the present invention, there is provided an image sensing apparatus comprising: a pixel array in which a plurality of pixels are arrayed in a row direction and a column direction; a readout unit which reads out a signal from the pixel array; a first terminal which externally receives a first power supply voltage; and a second terminal which externally receives a second power supply voltage, wherein the readout unit includes a column amplification unit which amplifies a signal read out from a pixel on each column of the pixel array, a holding unit which holds the signal amplified by the column amplification unit, a first power supply line which transfers, to the column amplification unit, the first power supply voltage applied from the first terminal, and a second power supply line which transfers, to the holding unit, the second power supply voltage applied from the second terminal, and wherein the column amplification unit includes a first input transistor having a gate electrode and back-gate electrode, the gate electrode receiving a signal read out from a pixel on each column of the pixel array, and the holding unit including a capacitor having a first electrode and a second electrode, the first electrode receiving a signal amplified by the column amplification unit, and wherein the first power supply line transfers the first power supply voltage to the back-gate electrode of the transistor, and the second power supply line transfers the second power supply voltage to the second electrode of the capacitor.

According to the second aspect of the present invention, there is provided an imaging system comprising: an image sensing apparatus according to the first aspect of the present invention; a power supply circuit which generates a first power supply voltage and a second power supply voltage; a third power supply line which transfers the first power supply voltage from the power supply circuit to the first terminal of the image sensing apparatus; and a fourth power supply line which transfers the second power supply voltage from the power supply circuit to the second terminal of the image sensing apparatus.

The present invention can suppress mixing of a pseudo signal in a pixel output upon capturing a bright object.

Further features of the present invention will become apparent from the following description of exemplary embodiments with reference to the attached drawings.

DESCRIPTION OF THE EMBODIMENTS

A problem to be solved by the present invention will be explained in detail with reference to FIG. 9.

The study by the present inventors exhibits that the principal component of a pseudo signal mixed in a pixel output upon capturing a bright object using an image sensor such as a CMOS sensor is based on fluctuations of the voltage of the back-gate electrode of an input transistor in a column amplifier. FIG. 9 shows an example of an operational amplifier which forms part of the column amplifier.

A column amplifier (operational amplifier) AM includes input transistors 201 and 202, a constant current source 203, a current mirror circuit CM1, and an output terminal 207.

Both the input transistors 201 and 202 are N-channel MOS transistors. The gate electrode of the input transistor 201 functions as a non-inverting input terminal. The gate electrode of the input transistor 202 functions as an inverting input terminal. The back-gate electrodes of the input transistors 201 and 202 are connected to the above-mentioned ground supply line.

The constant current source 203 generates a constant current. One terminal of the constant current source 203 is connected to the ground supply line.

The current mirror circuit CM1 includes transistors (load elements) 204 and 205. The transistor 204 is connected to the drain of the input transistor 201. The transistor 205 is connected to the drain of the input transistor 202. Both the transistors 204 and 205 are P-channel MOS transistors. The current mirror circuit CM1 makes the same current that flows through the source-drain path of the transistor 204 flow through the source-drain path of the transistor 205.

The output terminal 207 outputs a signal (voltage) corresponding to the difference between a signal input to the input transistor 201 and that input to the input transistor 202.

When an image sensing apparatus including the column amplifier AM captures a bright object, the potential of the ground supply line fluctuates transiently, as described above. Owing to the transient response of the ground supply line, the voltages of the back-gate electrodes of the input transistors 201 and 202 in the column amplifier fluctuate, as shown in FIG. 9. As a threshold potential of a transistor varies upon fluctuation of the voltages of the back-gate electrodes, the operating points (threshold potentials) of the input transistors 201 and 202 change. At this time, the common-mode gain is not 0 in an actual operational amplifier, so a signal (voltage) output from the output terminal 207 varies. Although the same voltage is applied to the two input transistors 201 and 202 which form a differential pair, a phenomenon equivalent to variations in absolute level occurs. As a result, the output voltage fluctuates though the input voltage does not fluctuate. This is the principal component of a pseudo signal.

The above-described problem pertinent to the ground supply line is mainly caused by crosstalk between low-resistance wirings. Thus, this problem cannot be solved by forming the accumulation capacitor and back-gate electrode in different wells, that is, separating them in a semiconductor substrate.

Figure 1:
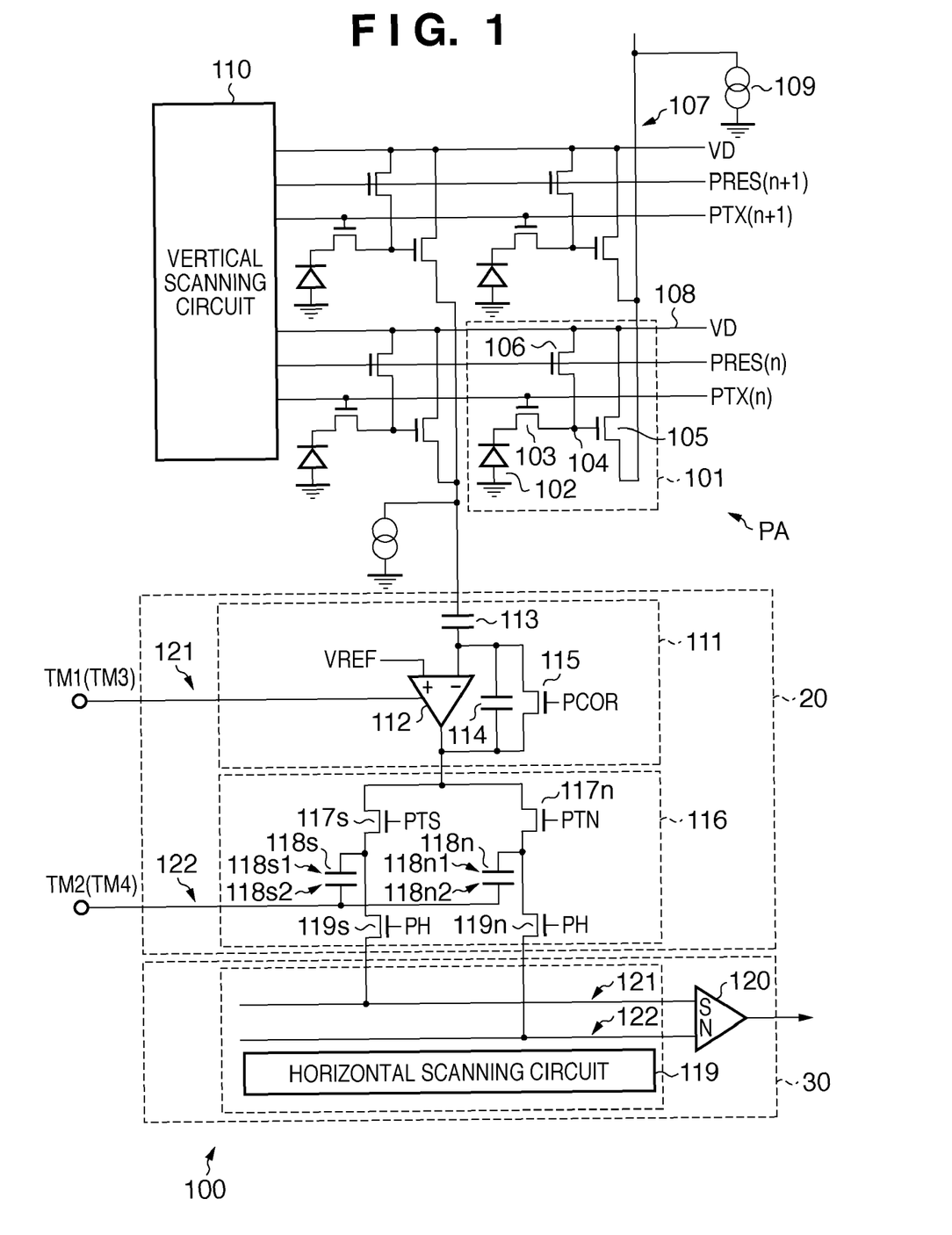
FIG. 1 is a circuit diagram of the arrangement of an image sensing apparatus 100 according to the first embodiment of the present invention.

An image sensing apparatus 100 according to the first embodiment of the present invention will be explained with reference to FIG. 1. FIG. 1 is a circuit diagram of the arrangement of the image sensing apparatus 100 according to the first embodiment of the present invention.

The image sensing apparatus 100 includes a pixel array PA, vertical scanning circuit 110, first terminal TM1 (or TM3), second terminal TM2 (or TM4), readout unit 20, and output unit 30.

In the pixel array PA, a plurality of pixels 101 are arranged in the row and column directions. In the example of FIG. 1, the pixel array PA includes a total of 4 pixels consisting of 2 rows and 2 columns.

Each pixel 101 includes a photoelectric conversion element 102, transfer gate 103, floating diffusion portion 104, amplification transistor 105, and reset transistor 106. The photoelectric conversion element 102 accumulates a signal (charges) corresponding to light. The transfer gate 103 transfers the signal accumulated in the photoelectric conversion element 102 to the floating diffusion portion 104. The floating diffusion portion 104 outputs the transferred signal to the amplification transistor 105. The amplification transistor 105 performs a source follower operation in conjunction with a constant current source 109 to amplify the signal output from the floating diffusion portion 104 and output the amplified signal to a corresponding pixel output line 107. The reset transistor 106 resets the floating diffusion portion 104 to a predetermined potential.

Pixel output lines 107 are distributedly connected to upper and lower readout units (read circuits) 20 every other column. In FIG. 1, no upper readout unit is illustrated. In FIG. 1, the reset transistor 106 has a source connected to the floating diffusion portion 104 and the gate of the amplification transistor 105, and a drain connected to a drain line 108 commonly together with the drain of the amplification transistor 105.

The vertical scanning circuit 110 sequentially selects rows from which signals are read out in the pixel array PA. The vertical scanning circuit 110 raises the gate potential of the amplification transistor 105 to select a row from which a signal is read out in the pixel array PA. That is, the vertical scanning circuit 110 drives the pixel array PA to decrease the gate potentials of the amplification transistors 105 of pixels on an unselected row and increase those of the amplification transistors 105 of pixels on a selected row. In response to this, only the amplification transistors 105 of pixels on a selected row are turned on to change the potentials of the pixel output lines 107 in accordance with those of the floating diffusion portions 104 on the selected row. To the contrary, the amplification transistors 105 on the unselected row are turned off.

The first terminal TM1 (or TM3) externally receives a first power supply voltage V1.

The second terminal TM2 (or TM4) externally receives a second power supply voltage V2.

The readout unit 20 reads out a signal from the pixel array PA. The readout unit 20 includes a column amplifier (column amplification unit) 111, holding unit 116, first power supply line 121, and second power supply line 122. The column amplifier 111 generates the difference signal of each column by calculating the difference between noise and optical signals read out from a pixel on each column of the pixel array PA. The column amplifier 111 amplifies the generated difference signal and outputs it to the holding unit 116. The holding unit 116 receives the signal amplified by the column amplifier 111, and holds it for a predetermined period. The first power supply line 121 receives the first power supply voltage V1 from the first terminal TM1 (or TM3). The first power supply line 121 transfers, to the column amplifier 111, the first power supply voltage V1 received from the first terminal TM1 (or TM3). The second power supply line 122 receives the second power supply voltage V2 from the second terminal TM2 (or TM4). The second power supply line 122 transfers, to the holding unit 116, the second power supply voltage V2 received from the second terminal TM2 (or TM4).

The column amplifier 111 includes an operational amplifier 112, input capacitor 113, feedback capacitor 114, and clamp control switch 115. The column amplifier 111 amplifies a signal by an inverting gain corresponding to the ratio of the input capacitor 113 and feedback capacitor 114. The operational amplifier 112 receives a reference signal VREF at a "+" terminal (non-inverting input terminal in FIG. 9), and a signal read out from the pixel 101 at a "−" terminal (inverting input terminal in FIG. 9). The output node (output terminal 207 in FIG. 9) of the operational amplifier 112 outputs a signal corresponding to a difference signal between the signal read out from the pixel 101 and the reference signal. A detailed description of the arrangement of the operational amplifier 112 is the same as that of FIG. 9, and will not be repeated.

The holding unit 116 includes transfer switches 117s, 117n, 119s, and 119n, and accumulation capacitors 118s and 118n. The transfer switch 117n transfers the first signal output from the column amplifier 111 to the accumulation capacitor 118n. The first signal is the signal of the offset of the column amplifier 111. The transfer switch 117s transfers, to the accumulation capacitor 118s, the second signal output from the column amplifier 111. The second signal is a signal in which the offset of the column amplifier 111 is superposed on the difference signal. The accumulation capacitors 118s and 118n hold the second and first signals for a predetermined period, respectively. The accumulation capacitors 118s and 118n respectively include first electrodes 118s1 and 118n1 which receive a signal amplified by the column amplifier 111, and second electrodes 118s2 and 118n2. The second electrode 118s2 and 118n2 are respectively arranged at a position such that a first and second electrodes form a capacitor. For example, the second electrodes 118s2 and 118n2 respectively face the first electrodes 118s1 and 118n1. The transfer switches 119s and 119n transfer (output) the second and first signals respectively held by the accumulation capacitors 118s and 118n to the output unit 30.

The output unit 30 generates an image signal (pixel output) on the basis of the first and second signals output from the readout unit 20, and outputs it outside the image sensing apparatus 100.

The output unit 30 includes a horizontal scanning circuit 119 and differential amplifier 120. The horizontal scanning circuit 119 sequentially turns on the transfer switches 119s and 119n on each column to output the second and first signals of the column from the accumulation capacitors 118s and 118n to the differential amplifier 120. The differential amplifier 120 calculates the difference between the second and first signals to generate an image signal (pixel output). The differential amplifier 120 outputs the image signal outside the image sensing apparatus 100.

Figure 2:
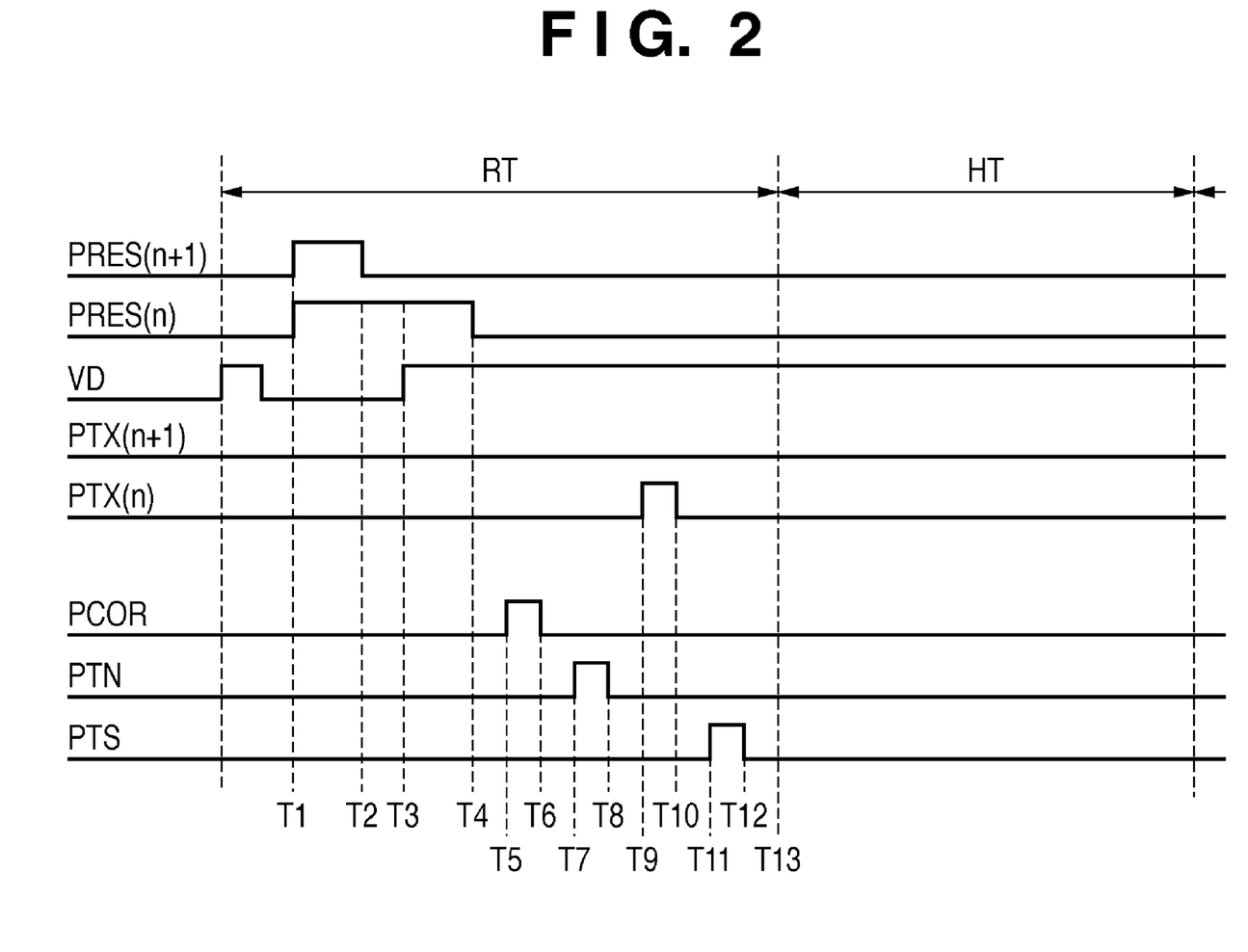
FIG. 2 is a timing chart showing the operation of the image sensing apparatus 100.

The operation of the image sensing apparatus 100 will be explained with reference to FIG. 2. FIG. 2 is a timing chart showing the operation of the image sensing apparatus 100.

During a pixel read period RT, the following operation is performed.

During the period between timings T1 and T2, the vertical scanning circuit 110 changes reset signals PRES(n) and PRES(n+1) supplied to pixels on all rows to high level. Then, the reset transistors 106 in all pixels reset the floating diffusion portions 104 to low level in accordance with a low-level reset voltage VD applied via the drain lines 108. That is, the vertical scanning circuit 110 controls pixels on all the rows of the pixel array PA to an unselected state.

During the period between timings T3 and T4, the vertical scanning circuit 110 changes the reset signal PRES(n+1) supplied to pixels on unselected rows (rows other than the $n^{th}$ row) to low level while keeping high a level of the reset signal PRES(n) supplied to pixels on a selected row ($n^{th}$ row). The potential level VD of the drain line 108 changes to high level, and the floating diffusion portions 104 on the selected row are reset to high level. Then, pixels on the selected row are selected. At this time, a noise signal corresponding to the reset potential (high level) of the floating diffusion portion 104 of each selected pixel is read out to a corresponding pixel output line 107.

Figure 9:
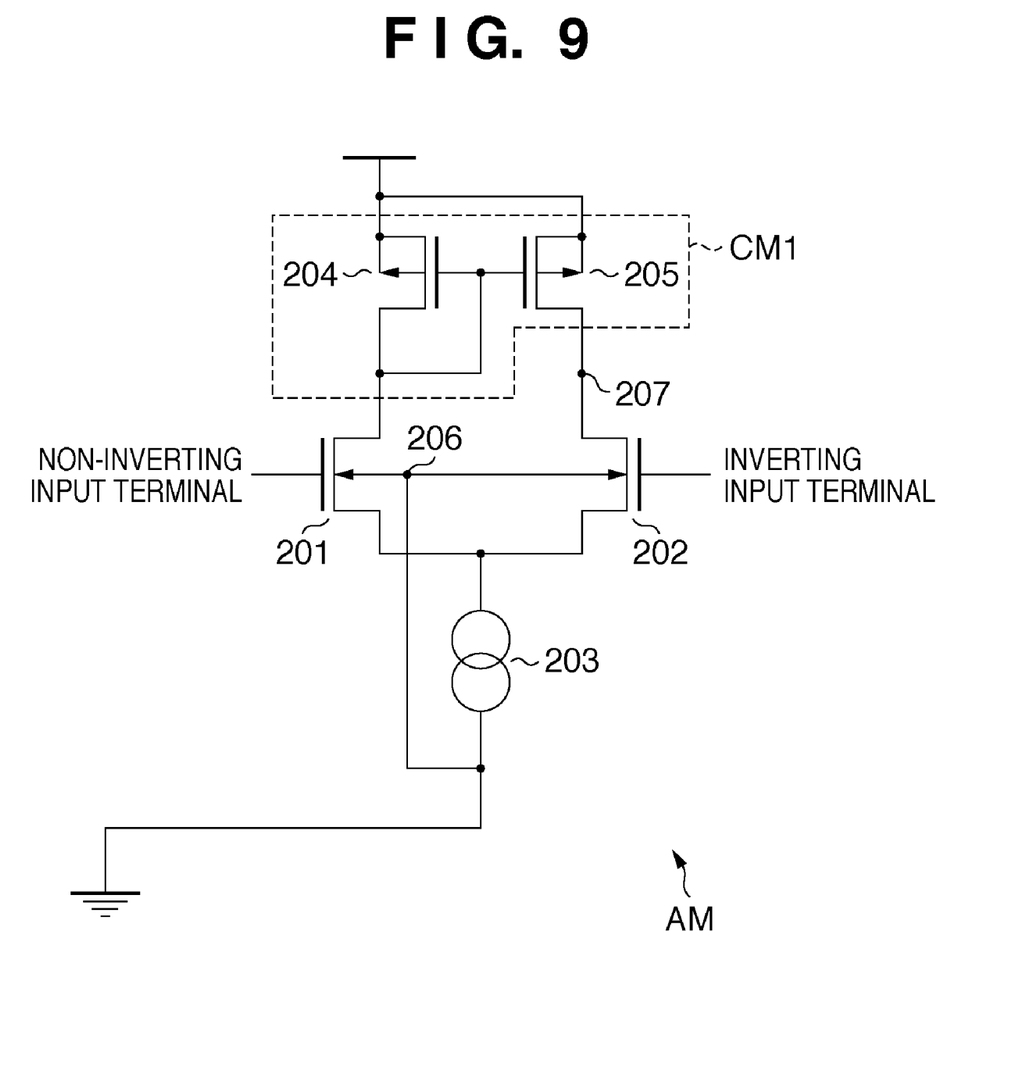
FIG. 9 is a circuit diagram for explaining the problem to be solved by the present invention.

During the period between timings T5 and T6, the vertical scanning circuit 110 (or a timing generator 98 as shown in FIG. 9) changes a control signal PCOR supplied to the clamp control switch 115 of the column amplifier 111 in the readout unit 20 to high level. Then, the inverting input terminal and output terminal of the column amplifier 111 are short-circuited to clamp the output terminal at the VREF potential (reference signal).

During the period between timings T7 and T8, the vertical scanning circuit 110 changes a control signal PTN supplied to the transfer switch 117n to high level. Then, the first signal (offset of the column amplifier 111) is transferred from the column amplifier 111 to the accumulation capacitor 118n.

During the period between timings T9 and T10, the vertical scanning circuit 110 changes a transfer signal PTX(n) supplied to pixels on the selected row ($n^{th}$ row) to high level. In each selected pixel, a signal accumulated in the photoelectric conversion element 102 is transferred to the floating diffusion portion 104 via the transfer gate 103. An optical signal (pixel signal+noise signal) corresponding to the potential of the floating diffusion portion 104 of the selected pixel is read out to a corresponding pixel output line 107.

During the period between timings T11 and T12, the vertical scanning circuit 110 changes a control signal PTS supplied to the transfer switch 117s to high level. Then, the second signal (pixel signal+offset) is transferred from the column amplifier 111 to the accumulation capacitor 118s.

During a horizontal scanning period HT, the following operation is performed.

The horizontal scanning circuit 119 sequentially turns on the transfer switches 119s and 119n on each column to output the second and first signals of the column from the accumulation capacitors 118s and 118n to the differential amplifier 120. The differential amplifier 120 calculates the difference between the second and first signals to generate an image signal (pixel output). The differential amplifier 120 outputs the image signal outside the image sensing apparatus 100.

In this manner, the vertical scanning circuit 110 causes pixels on a selected row to execute the operations in the pixel read period RT and horizontal scanning period HT. The vertical scanning circuit 110 sequentially selects rows (selected rows) from which signals are read out in the pixel array PA, and causes pixels on a selected row to perform the above-described operations. As a result, optical outputs from all pixels in the frame are acquired.

In the above description, it is possible to set the low level of the VD to 0.3 V to 1.0 V, and its high level to 3.3 V.

Figure 3:
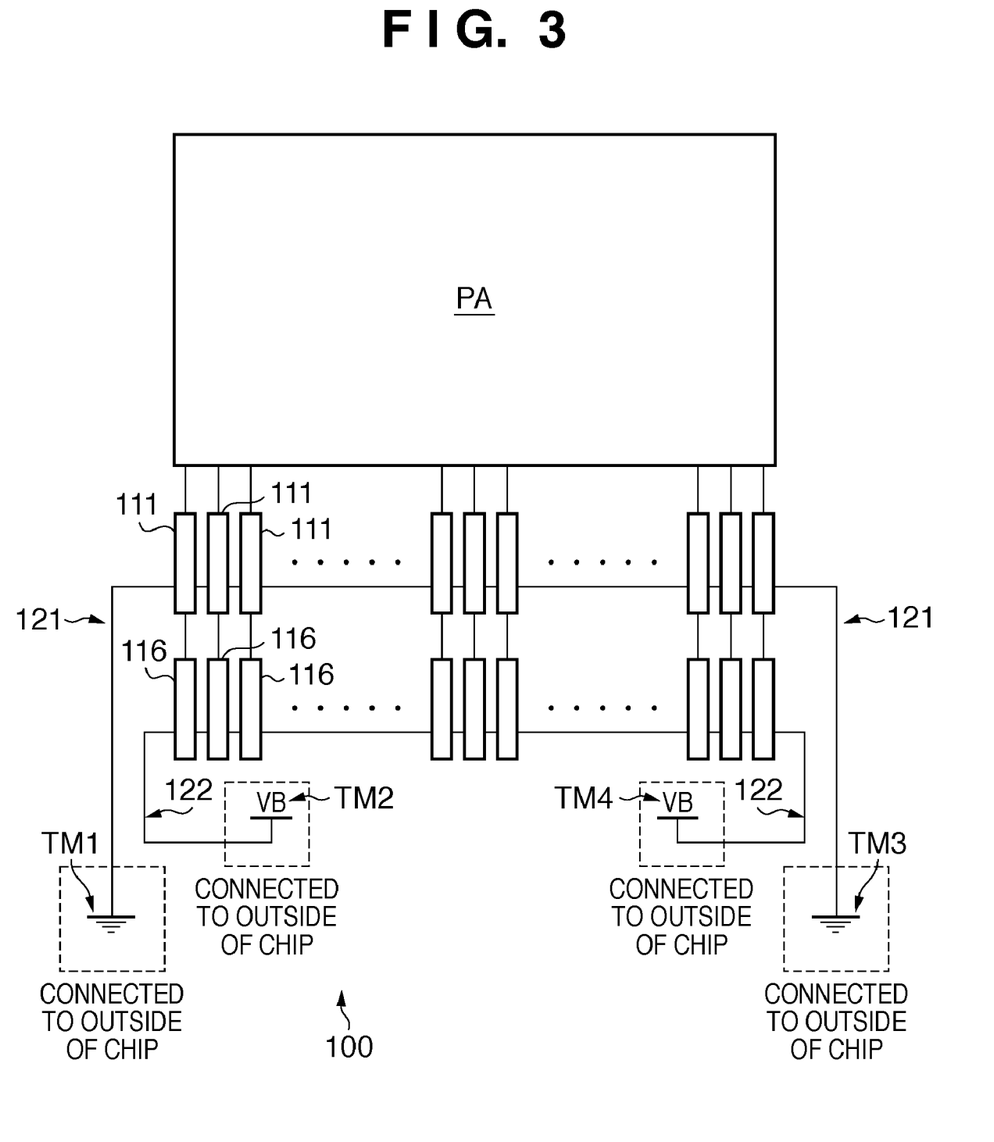
FIG. 3 is a diagram of the arrangement of the image sensing apparatus 100.

Features of the first embodiment will be explained in detail with reference to FIG. 3. FIG. 3 is a diagram of the arrangement of the image sensing apparatus 100.

In the image sensing apparatus 100, the first terminal TM1 (or TM3) externally receives the first power supply voltage V1. The first power supply voltage V1 is the ground voltage and is, for example, 0 V.

The second terminal TM2 (or TM4) externally receives the second power supply voltage V2. The second power supply voltage V2 is a voltage VB different from a main power supply voltage VDD (e.g., 3.3 V) and the ground voltage (e.g., 0 V), and is, for example, 1.5 V. The second terminal TM2 (or TM4) is dedicated to externally apply the voltage VB.

The first power supply line 121 receives the first power supply voltage V1 from the first terminal TM1 (or TM3). The first power supply line 121 transfers the first power supply voltage V1, received from the first terminal TM1 (or TM3), to the column amplifier 111 corresponding to each column of the pixel array PA. In other words, the first power supply line 121 applies the first power supply voltage V1 to the back-gate electrodes of input transistors 201 and 202 (see FIG. 9) of the operational amplifier 112 in the column amplifier 111 of each column.

In contrast, the second power supply line 122 receives the second power supply voltage V2 from the second terminal TM2 (or TM4). The second power supply line 122 transfers the second power supply voltage V2, received from the second terminal TM2 (or TM4), to the holding unit 116 corresponding to each column of the pixel array PA. The second power supply line 122 applies the second power supply voltage V2 to the second electrodes 118s2 and 118n2 (see FIG. 1) of the accumulation capacitors 118s and 118n in the holding unit 116 of each column.

In the image sensing apparatus 100, the first and second power supply lines 121 and 122 are spaced apart from each other, and do not cross each other. For this reason, even if the potential of the second power supply line 122 fluctuates transiently upon accumulating large signals in the first electrodes 118s1 and 118n1 (see FIG. 1) of the accumulation capacitors 118s and 118n in the holding unit 116 of each column, the first power supply line 121 is free from this influence of fluctuation. Even when the pixel array PA senses a bright object, the first power supply line 121 can stably apply the first power supply voltage V1 to the back-gate electrodes of the input transistors 201 and 202 (see FIG. 9). This can suppress mixing of a pseudo signal in a pixel output upon capturing a bright object.

Although the second power supply line 122 is connected to the outside of the chip at two portions, the second power supply line 122 may also be connected to it at one portion. When the second power supply line 122 is connected to the outside of the chip at two portions, although the impedance can be reduced, the chip size or the number of pads disadvantageously increases, compared to the case where it is connected to the outside of the chip at one portion. They are design matters under restrictions on the number of pixels, the chip size, and the number of pads.

The operational amplifier 112 is not limited to one shown in FIG. 9. For example, a folded-cascade or telescopic differential amplification circuit is also applicable.

Figure 4:
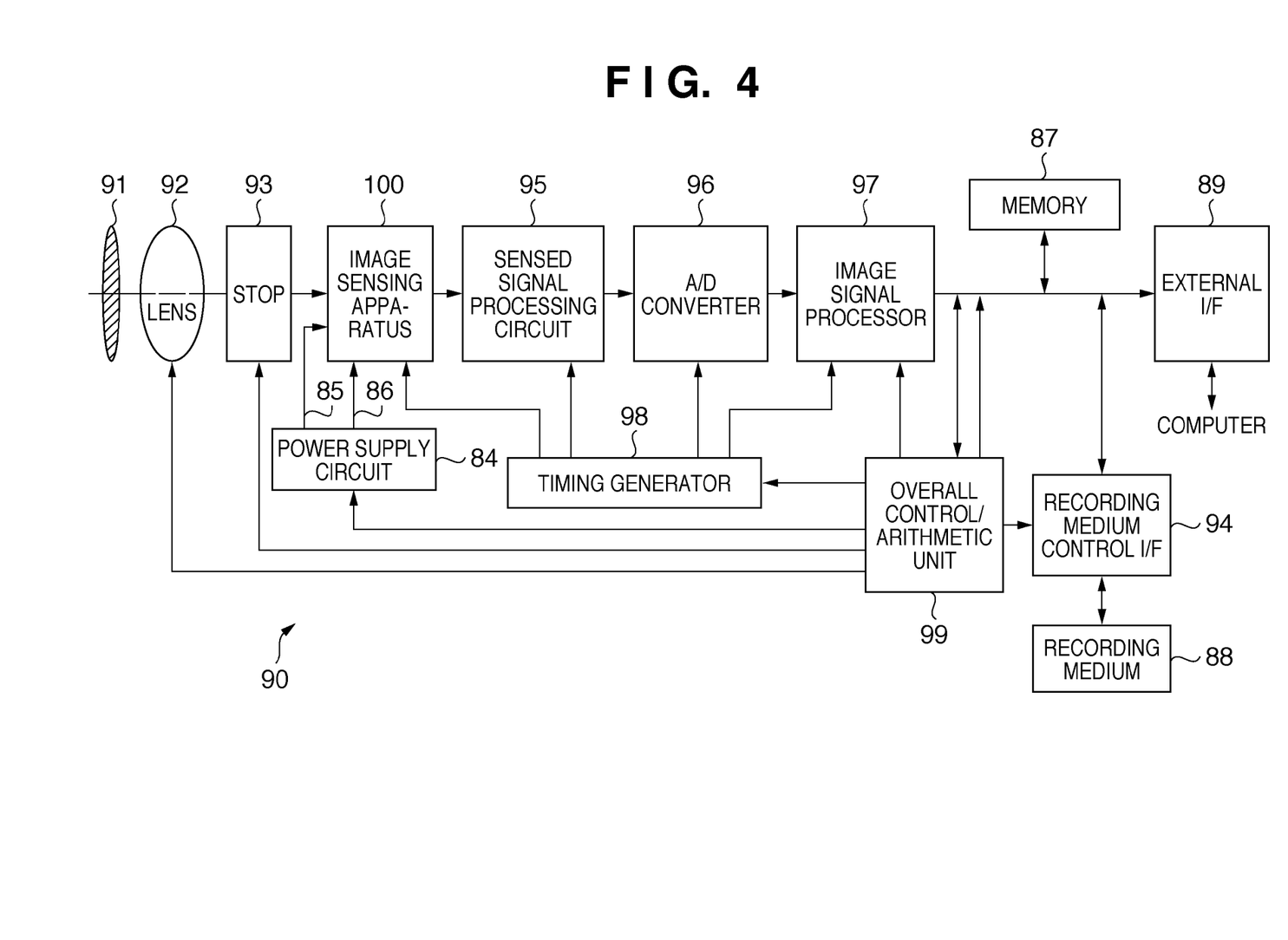
FIG. 4 is a block diagram of the arrangement of an imaging system to which the image sensing apparatus according to the first embodiment is applied.

FIG. 4 shows an example of an imaging system to which the image sensing apparatus according to the present invention is applied.

As shown in FIG. 4, an imaging system 90 mainly includes an optical system, the image sensing apparatus 100, and a signal processing unit. The optical system mainly includes a shutter 91, lens 92, and stop 93. The signal processing unit mainly includes a sensed signal processing circuit 95, A/D converter 96, image signal processor 97, memory 87, external I/F 89, timing generator 98, overall control/arithmetic unit 99, recording medium 88, and recording medium control I/F 94. The signal processing unit may not include the recording medium 88.

The shutter 91 is arranged in front of the lens 92 on the optical path to control the exposure.

The lens 92 refracts incident light to form an object image on the pixel array (image sensing plane) of the image sensing apparatus 100.

The stop 93 is interposed between the lens 92 and the image sensing apparatus 100 on the optical path. The stop 93 adjusts the quantity of light guided to the image sensing apparatus 100 after passing through the lens 92.

The image sensing apparatus 100 converts an object image formed on the pixel array into an image signal. The image sensing apparatus 100 reads out the image signal from the pixel array, and outputs it.

The sensed signal processing circuit 95 is connected to the image sensing apparatus 100, and processes an image signal output from the image sensing apparatus 100.

The A/D converter 96 is connected to the sensed signal processing circuit 95. The A/D converter 96 converts a processed image signal (analog signal) output from the sensed signal processing circuit 95 into a digital signal.

The image signal processor 97 is connected to the A/D converter 96. The image signal processor 97 performs various arithmetic processes such as correction for an image signal (digital signal) output from the A/D converter 96, generating image data. The image signal processor 97 supplies the image data to the memory 87, external I/F 89, overall control/arithmetic unit 99, recording medium control I/F 94, and the like.

The memory 87 is connected to the image signal processor 97, and stores image data output from the image signal processor 97.

The external I/F 89 is connected to the image signal processor 97. Image data output from the image signal processor 97 is transferred to an external device (e.g., a personal computer) via the external I/F 89.

The timing generator 98 is connected to the image sensing apparatus 100, sensed signal processing circuit 95, A/D converter 96, and image signal processor 97. The timing generator 98 supplies timing signals to the image sensing apparatus 100, sensed signal processing circuit 95, A/D converter 96, and image signal processor 97. The image sensing apparatus 100, sensed signal processing circuit 95, A/D converter 96, and image signal processor 97 operate in synchronism with the timing signals.

A power supply circuit 84 generates the first and second power supply voltages V1 and V2. The power supply circuit 84 is connected to the first terminal TM1 (or TM3) of the image sensing apparatus 100 via a third power supply line 85, and the second terminal TM2 (or TM4) of the image sensing apparatus 100 via a fourth power supply line 86. The third power supply line 85 transfers the first power supply voltage V1 from the power supply circuit 84 to the first terminal TM1 (or TM3) of the image sensing apparatus 100. The fourth power supply line 86 transfers the second power supply voltage V2 from the power supply circuit 84 to the second terminal TM2 (or TM4) of the image sensing apparatus 100.

The overall control/arithmetic unit 99 is connected to the timing generator 98, image signal processor 97, recording medium control I/F 94, and power supply circuit 84, and controls all of them.

The recording medium 88 is detachably connected to the recording medium control I/F 94. Image data output from the image signal processor 97 is recorded on the recording medium 88 via the recording medium control I/F 94.

With this arrangement, the image sensing apparatus 100 can provide a high-quality image (image data) as long as it can obtain a high-quality image signal.

Figure 5:
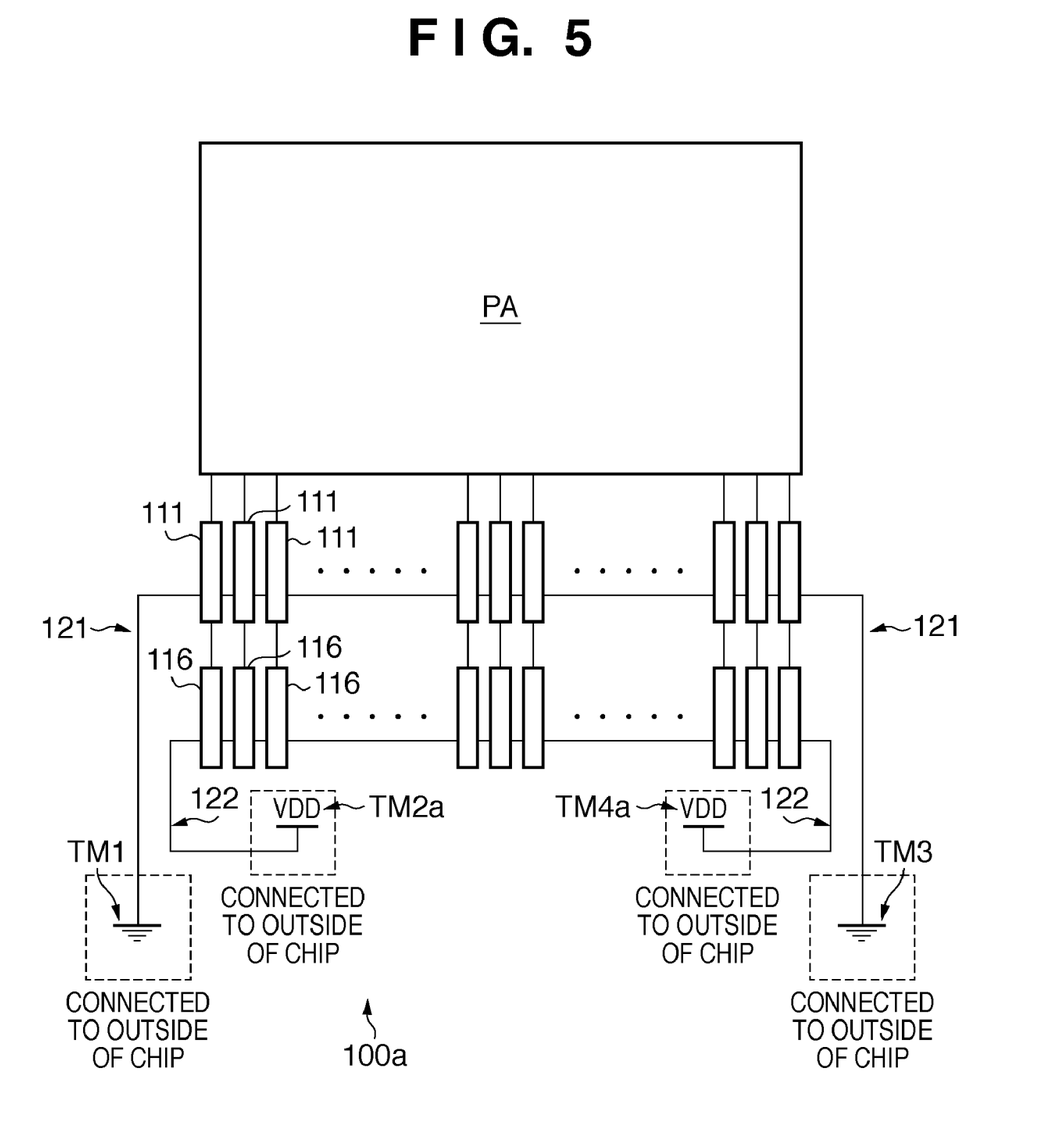
FIG. 5 is a diagram of the arrangement of an image sensing apparatus 100a according to the second embodiment of the present invention.

An image sensing apparatus 100a according to the second embodiment will be explained with reference to FIG. 5. FIG. 5 is a diagram of the arrangement of the image sensing apparatus 100a according to the second embodiment.

The image sensing apparatus 100a includes second terminals TM2a and TM4a.

The second terminal TM2a (TM4a) externally receives the second power supply voltage V2. The second power supply voltage V2 is the main power supply voltage VDD and is, for example, 3.3 V.

In the image sensing apparatus 100a, the second terminal TM2a (or TM4a) also receives the main power supply voltage VDD to be applied to another circuit (e.g., a vertical scanning circuit 110 or horizontal scanning circuit 119: see FIG. 1). This can decrease the number of terminals for receiving a signal, that of bonding wires, that of pads, and the like in the image sensing apparatus 100a. A line for transferring the main power supply voltage VDD can be shared with another circuit. As a result, the manufacturing cost of the image sensing apparatus 100a can be reduced.

Figure 6:
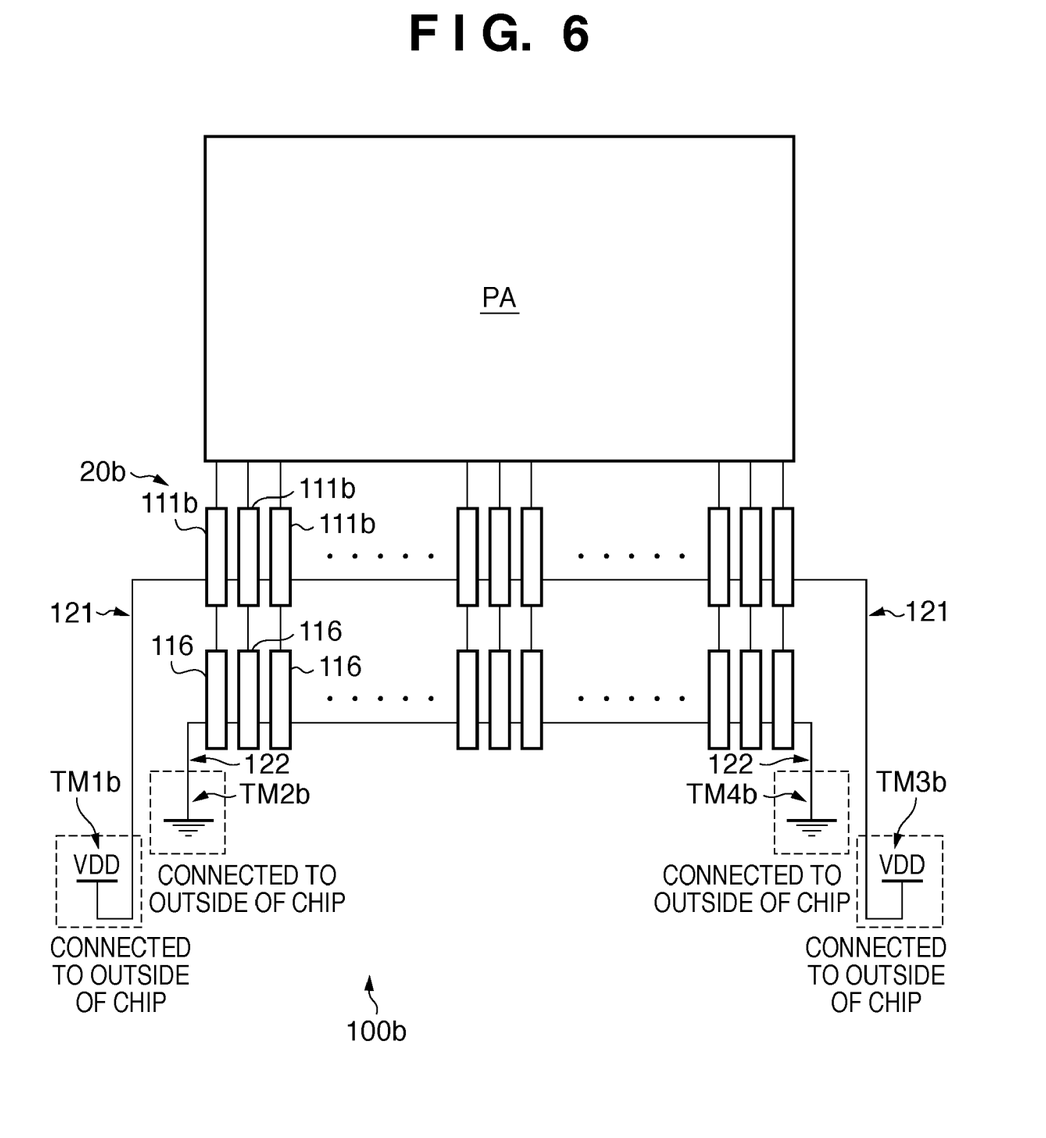
FIG. 6 is a diagram of the arrangement of an image sensing apparatus 100b according to the third embodiment of the present invention.

An image sensing apparatus 100b according to the third embodiment will be explained with reference to FIG. 6. FIG. 6 is a diagram of the arrangement of the image sensing apparatus 100b according to the third embodiment.

The image sensing apparatus 100b includes a readout unit 20b, first terminals TM1b and TM3b, and second terminals TM2b and TM4b.

Figure 7:
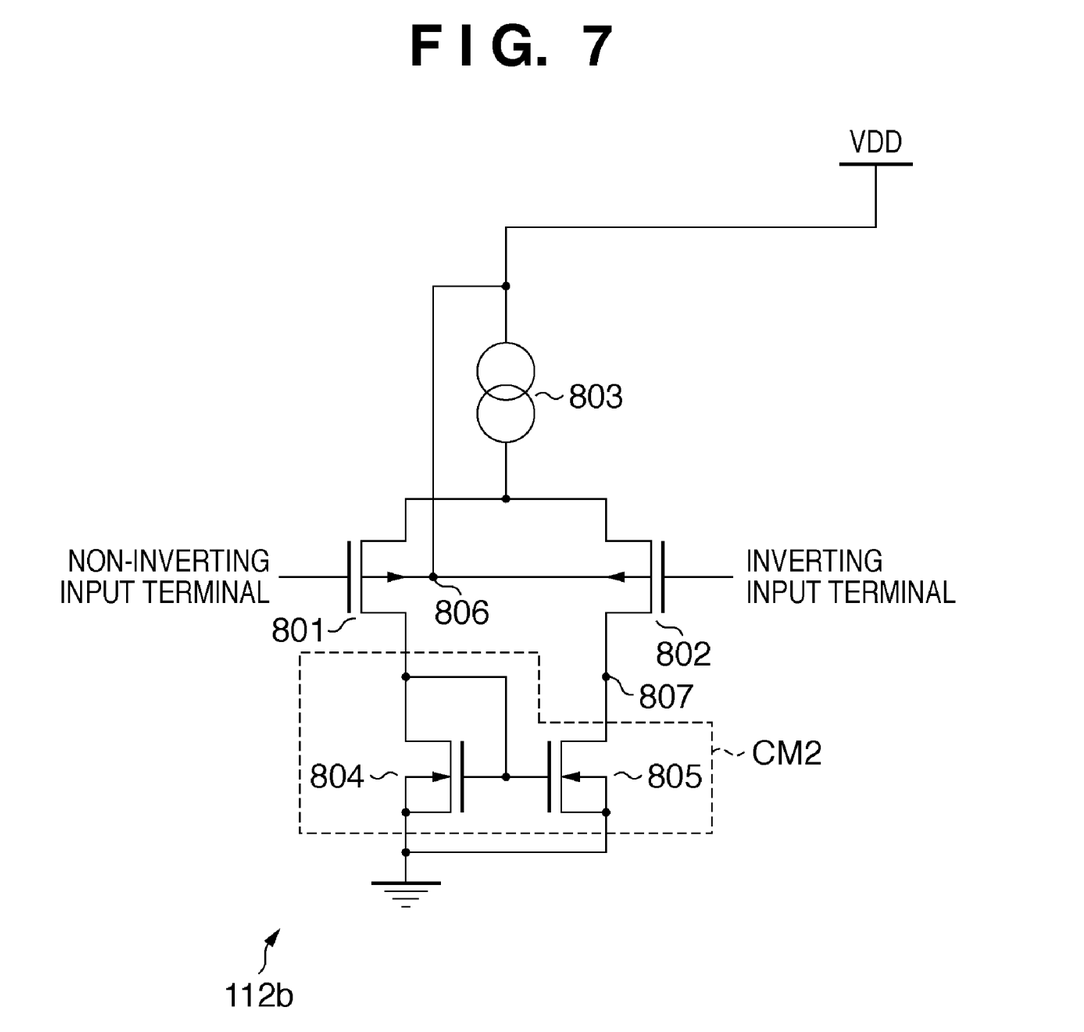
FIG. 7 is a circuit diagram of the arrangement of an operational amplifier 112b.

The readout unit 20b includes column amplifiers 111b. Each column amplifier 111b includes an operational amplifier 112b as shown in FIG. 7. The operational amplifier 112b includes input transistors 801 and 802, a constant current source 803, a current mirror circuit CM2, and an output terminal 807.

Both the input transistors 801 and 802 are P-channel MOS transistors. The gate electrode of the input transistor 801 functions as a non-inverting input terminal. The gate electrode of the input transistor 802 functions as an inverting input terminal. The back-gate electrodes of the input transistors 801 and 802 are connected to a first power supply line 121.

The constant current source 803 generates a constant current. One terminal of the constant current source 803 is connected to the first power supply line 121.

The current mirror circuit CM2 includes transistors (load elements) 804 and 805. The transistor 804 is connected to the drain of the input transistor 801. The transistor 805 is connected to the drain of the input transistor 802. Both the transistors 804 and 805 are N-channel MOS transistors. The current mirror circuit CM2 makes the same current that flows through the source-drain path of the transistor 804 flow through the source-drain path of the transistor 805. The output terminal 807 outputs a signal (voltage) corresponding to the difference between a signal input to the input transistor 801 and that input to the input transistor 802.

The first terminal TM1b (or TM3b) externally receives the first power supply voltage V1. The first power supply voltage V1 is the main power supply voltage VDD and is, for example, 3.3 V.

The second terminal TM2b (or TM4b) externally receives the second power supply voltage V2. The second power supply voltage V2 is the ground voltage and is, for example, 0 V.

Power supply voltage supplied to the second electrode of the accumulation capacitor is the ground voltage having stable level. Thus, compared to the first and second embodiments, the third embodiment can reduce the influence of transient fluctuation of the potential on an output from the column amplifier via the accumulation capacitor itself when reading out a signal to the accumulation capacitor. This influence of fluctuation varies between accumulation capacitors, and may also be a factor of a fixed pattern for each column.

In FIG. 7, the back-gate electrodes of the input transistors 801 and 802 and one terminal of the constant current source 803 are commonly connected to VDD serving as the first power supply voltage V1. In FIG. 9, the back-gate electrodes of the input transistors 201 and 202 and one terminal of the constant current source 203 are commonly connected to GND serving as the first power supply voltage V1. If the back-gate electrodes of the input transistors and one terminal of the constant current source are connected to different power supply lines, for example, a well region in the semiconductor substrate needs to be divided between the input transistors and the constant current source. This can complicate the layout of the image sensing apparatus. If the number of columns in the pixel array increases to increase the density, the area where column amplifiers can be arranged is limited. Hence, simplifying the layout of the image sensing apparatus is important for increasing the pixel density of the pixel array.

In the exemplified amplifier arrangement, the back-gate electrodes of the input transistors and one terminal of the constant current source are connected to a common power supply line. In an amplifier having nodes at the same potential, the back-gate electrodes of input transistors and all nodes at the same potential are also preferably connected to a common power supply line for the above-described reason.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-341121, filed Dec. 28, 2007, which is hereby incorporated by reference herein in its entirety.

What is claimed is:

1. An image sensing apparatus comprising:
    a pixel array in which a plurality of pixels are arrayed in a row direction and a column direction;
    a readout unit which reads out a signal from the pixel array;
    a first terminal which externally receives a first power supply voltage; and
    a second terminal which externally receives a second power supply voltage,
    wherein the readout unit includes
        a column amplification unit which amplifies a signal read out from a pixel on each column of the pixel array,
        a holding unit which holds the signal amplified by the column amplification unit,
        a first power supply line which transfers, to the column amplification unit, the first power supply voltage applied from the first terminal, and
        a second power supply line which transfers, to the holding unit, the second power supply voltage applied from the second terminal,
    and wherein the column amplification unit includes a first input transistor having a gate electrode and back-gate electrode, the gate electrode receiving a signal read out from a pixel on each column of the pixel array, and
    the holding unit including a capacitor having a first electrode and a second electrode, the first electrode receiving a signal amplified by the column amplification unit,
    and wherein the first power supply line transfers the first power supply voltage to the back-gate electrode of the transistor, and
    the second power supply line transfers the second power supply voltage to the second electrode of the capacitor.

2. The apparatus according to claim 1, wherein the column amplification unit further includes
    a second input transistor having a gate electrode and a back-gate electrode, the gate electrode receiving a reference signal,
    a plurality of load elements respectively connected to drains of the first input transistor and the second input transistor, a constant current source connected to sources of the first input transistor and the second input transistor, and an output terminal which outputs a signal corresponding to a difference signal between a signal read out from a pixel on each column of the pixel array and the reference signal.

3. The apparatus according to claim 2, wherein the first power supply line transfers the first power supply voltage to the back-gate electrode of the first input transistor, the back-gate electrode of the second input transistor, and the constant current source.

4. An imaging system comprising:

an image sensing apparatus according to claim 1;

a power supply circuit which generates a first power supply voltage and a second power supply voltage;

a third power supply line which transfers the first power supply voltage from the power supply circuit to the first terminal of the image sensing apparatus; and a fourth power supply line which transfers the second power supply voltage from the power supply circuit to the second terminal of the image sensing apparatus.

5. The system according to claim 4, further comprising:

an optical system which forms an image on an image sensing plane of the image sensing apparatus; and a signal processing unit which processes a signal output from the image sensing apparatus to generate image data.

* * * * *